United States Patent [19]

Nishide et al.

[11] Patent Number: 4,748,731

[45] Date of Patent: Jun. 7, 1988

[54] DRUM INSTALLING MECHANISM FOR TIRE-BUILDING MACHINE

[75] Inventors: Seiichiro Nishide; Makito Mukae, both of Tokyo, Japan

[73] Assignee: Bridgestone Corporation, Tokyo, Japan

[21] Appl. No.: 29,101

[22] Filed: Mar. 23, 1987

[30] Foreign Application Priority Data

Mar. 25, 1986 [JP] Japan ................. 61-66752

[51] Int. Cl.⁴ ............... B23P 19/00; B25B 13/50
[52] U.S. Cl. .............................................. 29/240
[58] Field of Search ............ 29/240, 264, 237; 279/7; 269/43, 48.1; 81/57.34, 57.16, 57.33

[56] References Cited

U.S. PATENT DOCUMENTS

| 2,760,393 | 8/1956 | Stough | 29/240 |
| 2,878,026 | 3/1959 | Pioch | 279/7 |
| 4,092,881 | 6/1978 | Jurgens et al. | 29/240 |
| 4,553,301 | 11/1985 | Hattori | 29/240 |

FOREIGN PATENT DOCUMENTS 58-49234 3/1983 Japan.

Primary Examiner—Robert C. Watson
Attorney, Agent, or Firm—Sughrue, Mion, Zinn, Macpeak, and Seas

[57] ABSTRACT

A drum installing mechanism for a tire-building machine comprises a pair of threaded sections which are disposed concentrically with a spindle and a drum and joined together by rotating an inner shaft only. The drum and the spindle are held axially fast by the threaded sections while being held rotationally fast by a connecting means including a plurality of connecting pins, axial holes, radial holes, locking pins and detent teeth.

6 Claims, 3 Drawing Sheets

DRUM INSTALLING MECHANISM FOR TIRE-BUILDING MACHINE

BACKGROUND OF THE INVENTION

1. Field of the Invention

The present invention relates in general to tire-building machines and more particularly to a mechanism for installation and removal of a green tire forming drum in a tire-building machine.

2. Description of the Prior Art

Generally, a green tire forming drum, which is to be installed on a spindle of a tire-building machine, is of such weight that it ranges from about several hundred kilograms up to several tons. In case of placing bead bundles in position during tire construction, the drum is subjected to several tons of external force directed axially thereof. For this reason, the drum needs to be firmly and rigidly attached to the spindle of the tire-building machine. To this end, it has been common to fasten them with a number of fastening bolts, for example three to eight bolts. During installation, the drum is lifted by a crane and held next to the spindle while being axially aligned with same, after which both are fastened together with the above described fastening bolts.

A disadvantage of the prior art drum installing mechanism is that in installation of the drum each fastening bolts need to be tightened uniformly, i.e. with the same torque, resulting in the necessity of a delicate, difficult and time-consuming installation work. Further, irregularity in tightening of the fastening bolts may possibly deteriorate the concentricity between the drum and the spindle and cause vibrations of the drum during rotation of same, leading to deterioration in the quantity of the tire.

SUMMARY OF THE INVENTION

In accordance with the present invention, there is provided a novel and improved drum installing mechanism for a tire-building machine. The mechanism comprises an inner shaft concentrically disposed in a hollow spindle and rotatable relative thereto. A drum is axially held fast relative to the spindle by thread means having a pair of threaded sections disposed concentrically with the spindle and the drum. The threaded sections are joined together by rotating the inner shaft relative to the spindle by rotating means. A connecting means is provided for connecting the spindle, drum and inner shaft in such a manner as to hold them rotationally and releasably fast relative to each other.

The above structure is effective for overcoming the above noted disadvantage inherent in the prior art mechanism.

It is accordingly an object of the present invention to provide a novel and improved drum installing mechanism for a tire-building machine which does not require delicate, difficult and time consuming installation work.

It is a further object of the present invention to provide a novel and improved drum installing mechanism of the above described character which can improve the work efficiency in installation of the drum.

It is a still further object of the present invention to provide a novel and improved drum installing mechanism of the above described character which makes it possible to install the drum with an improved concentricity.

It is a yet further object of the present invention to provide a novel and improved drum installing mechanism of the above described character which can simplify not only the installation work but the removal work and therefore improve the work efficiency in removal of the drum.

DETAILED DESCRIPTION OF THE PREFERRED EMBODIMENT

Figure 1:
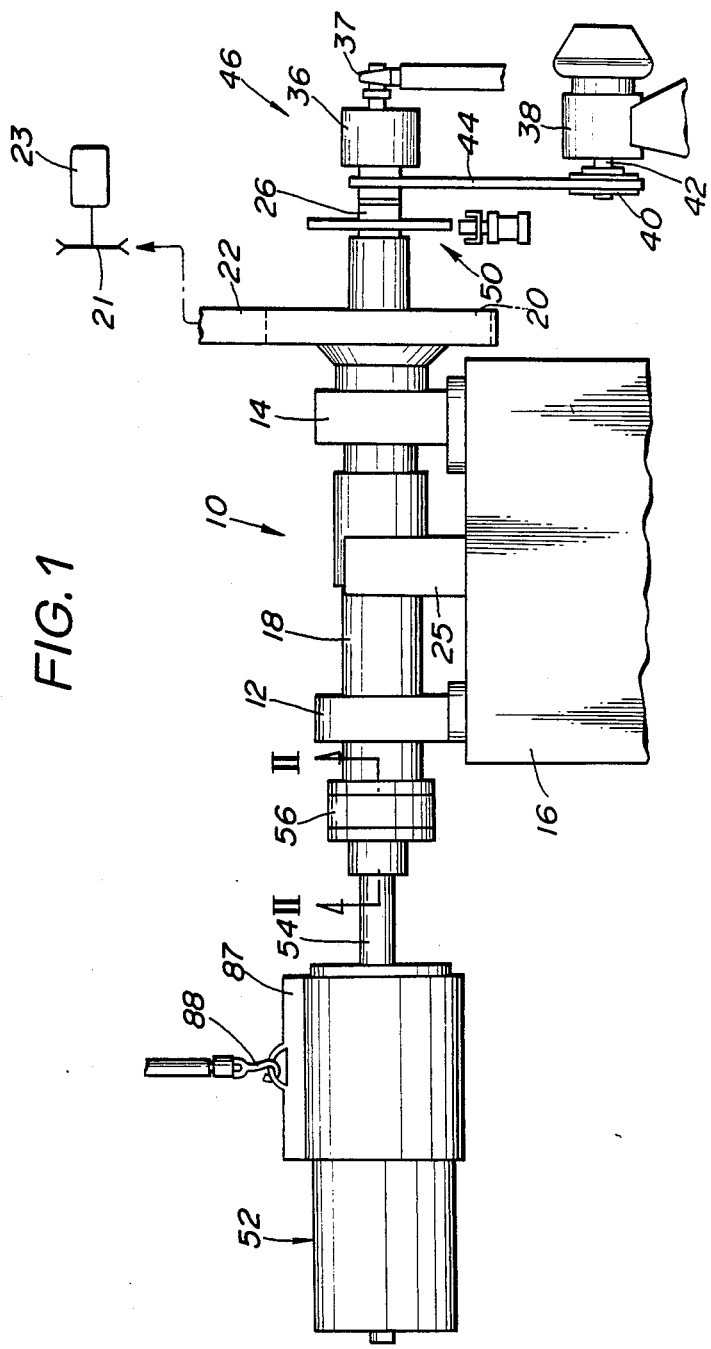
FIG. 1 is an elevational view of a tire-building machine in which a drum installing mechanism of the present invention is incorporated.

Referring to FIGS. 1 though 3, a tire-building machine is generally indicated by the reference numeral 10 and shown as including a pair of bearings 12, 14 installed on a base 16 and a hollow spindle 18 rotatably supported by the bearings 12, 14. The spindle 18 has at an end, i.e. at a right-hand end in the drawing, a pulley 20 around which a belt 22 is placed. The belt 22 is also placed around a pulley 21 of a driving motor 23 to transmit power to the spindle 18. A disc brake 25 is located between the bearings 12, 14 to apply a braking force to the spindle 18.

Figure 2:
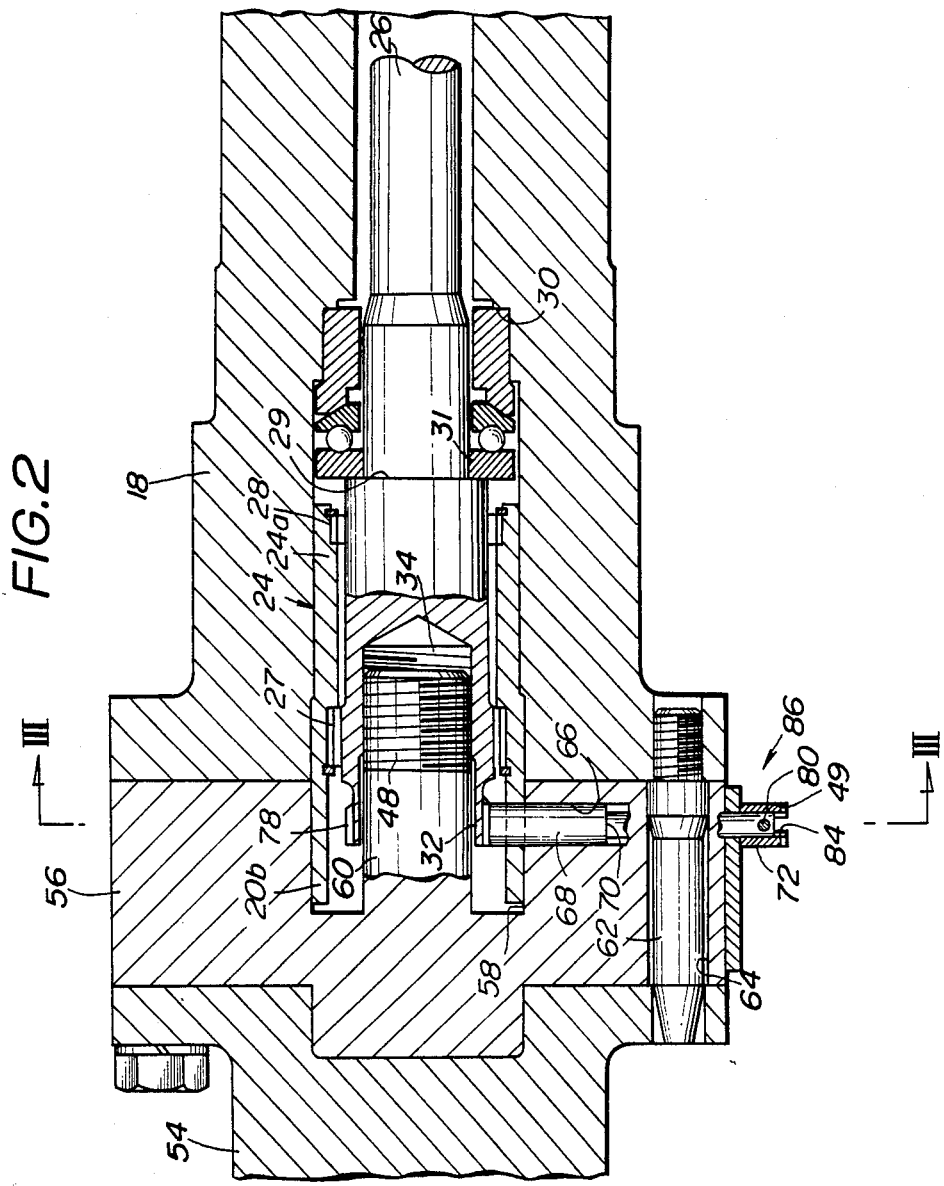
FIG. 2 is an enlarged sectional view taken along the line II—II of FIG. 1.
Figure 3:
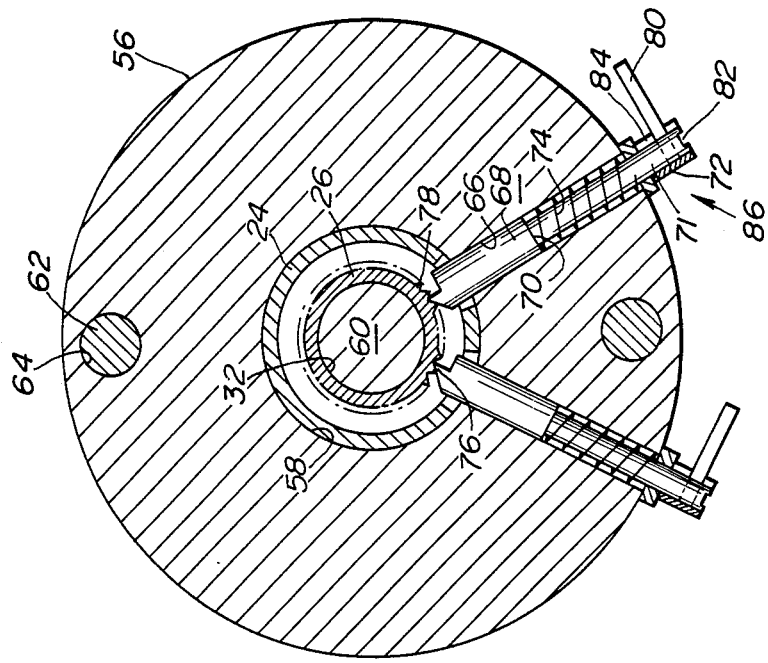
FIG. 3 is a sectional view taken along the line III—III of FIG. 2.

As shown in FIG. 2, the left-hand end of the spindle 18 is provided with a guide member 24 in the form of a cylindrical sleeve. The guide member 24 has a portion 24a disposed inside of the spindle 18 to be secured thereto and a portion 24b projecting outward from the left-hand end of the spindle 18. An inner shaft 26 is concentrically disposed in the spindle 18 and supported upon same by means of a pair of roller bearings 27, 28 so that the spindle 18 and the inner shaft 26 are rotatable relative to each other. More specifically, the inner shaft 26 has a left-hand end portion positioned inside of the guide member 24. The roller bearings 27, 28 are interposed between the left-hand end portion of the inner shaft 26 and the guide member 24. The inner shaft 26 has adjacent the left-hand end an annular shoulder 29 opposed to an annular shoulder 30 formed in the innder circumferential wall of the spindle 18. A thrust bearing 31 is interposed between the shoulders 29, 30 to support the inner shaft 26 upon the spindle 18 with respect to a predetermined axial direction of the inner shaft 26 or spindle 18. The left-hand end of the inner shaft 26 is formed with a concentric fastening hole 32 including a threaded hole section 34 on the bottom side thereof.

The right-hand end of the inner shaft 26 projects outward from the right-hand end of the spindle 18 and is rotatably supported by way of a clutch 36 on a bearing 37. The clutch 36 is adapted to be driven by an air motor 38 which is operative to produce a uniform torque at all times. To this end, the air motor 38 is provided with a pulley 40 attached to an output shaft 42. A belt 44 is placed around the pulley 40 and the clutch 36 to transmit power from the air motor 38 to the inner shaft 26 during engagement of the clutch 36. The inner shaft 26 is thus capable of being driven by the air motor 38 to rotate relative to the spindle 18.

The clutch 36, air motor 38 and belt 44 constitute a rotating means for rotating the inner shaft 26 relative to the spindle 18 and thereby fastening the threaded section 34 to a threaded section 48 which will be described hereinafter.

The right-hand end of the spindle 18 is provided with a means 50 for locating the spindle 18 and fixedly holding it at a predetermined angular position.

A drum 52 has a shaft 54 and is connected at an end of the shaft 54 to the left-hand end of the spindle 18 by way of a spacer 56. The spacer 56 is bolted or otherwise secured to the shaft 54 to constitute an integral unit therewith and is formed with a concentric guide hole 58 at a spindle side end in such a manner that the portion 24b of the guide member 24 is fittingly insertable into the guide hole 58. When the portion 24b of the guide member 24 is fitted in the guide hole 58, the spindle 18 and the drum 52 are accurately positioned and axially aligned with each other. The spacer 56 is also formed with a concentric fastening shaft 60 projecting from the bottom of the guide hole 58 toward the spindle 18. The fastening shaft 60 has at a circumferential end portion the aforementioned threaded section 48 which is screwed into the threaded section 34 of the inner shaft 26.

A plurality of connecting pins 62 are screwed into the left-hand end of the spindle 18 and projects therefrom toward the drum 52 in such a manner as to be parallel with the axis of the spindle 18. The spacer 56 is formed with a plurality of axial holes 66 corresponding in number and location to the connecting pins 62 so that the connecting pins 62 are respectively received in the axial holes 66 to make the spacer 56 and therefore the drum 52 rotationally held fast relative to the spindle 18.

The spacer 56 and guide member 24 are formed with a plurality of radial holes 66 in which locking pins 68 are movable toward and away from the inner shaft 26. Each locking pin 68 has a shoulder 70 and an outer end 71 projecting from the spacer 56 and received in a stopper 72 in the form of an annular sleeve and fixedly mounted on the outer periphery of the spacer 56. A spring 74 is mounted on each locking pin 68 and interposed between the shoulder 70 and the stopper 72 so as to urge the locking pin 68 against the inner shaft 26. The end of the locking pin 68 is formed with a finger 76 engageable with detent teeth 78 formed in the outer circumferential periphery of the left-hand end of the inner shaft 26. The outer end of each locking pin 68 is provided with a lever 80 extending at right angles to the axis of the locking pin 68. When the locking pin 68 is pulled outward to engage the lever 80 in a shallow groove 82 formed in the stopper 72, the finger 76 of the locking pin 68 is disengaged from the teeth 78. On the other hand, when the lever 80 is engaged in a deep groove 84 formed in the stopper 72, the locking pin 68 moves inward under the bias of the spring 74 to engage the finger 78 in the teeth 78. By this, the threaded sections 34, 48 are assuredly prevented from relative rotation and therefore from becoming loose, thus making the drum 52 and the spindle 18 axially held fast relative to each other. In this connection, the inner shaft 26 is held fast in movement toward the drum 52, i.e. in movement in the left-hand direction in FIGS. 1 and 2.

The connecting pins 62, axial holes 64, radial holes 66, locking pins 68 and detent teeth 78 constitute a connecting means 86 for rotationally connecting the spindle 18, inner shaft 26 and drum 52 to allow them to be rotatable together, i.e. so as to make them rotationally held fast relative to each other.

The drum installing mechanism thus far described according to the present invention operates as follows.

In removal of the drum 52, the spindle 18 is rotated to a predetermined angular position by actuating the driving motor 23 and fixedly held thereat by the holding means 50. The locking pins 68 are pulled outward against the bias of the springs 74 to engage the levers 80 in the shallow grooves 82. By this, the fingers 76 are disengaged from the detent teeth 78, thus allowing the spindle 18 and the inner shaft 26 to be rotatable relative to each other. A lifting band 87 is placed around the drum 52 and attached to a hook 88 of a crane. The crane is operated so as to support the drum 52. The air motor 38 is actuated to transmit a driving force to the inner shaft 26 by way of the clutch 36. By this, only the inner shaft 26 is rotated, causing the threaded sections 34, 48 to be unfastened from each other while pushing the drum 52 away from the spindle 18. The drum 52 is removed from the spindle 18 and taken out by the crane.

During installation, the drum 52 to be installed is lifted by the crane and held next to the spindle 18 while being axially aligned with same. At this time, the portion 24b of the guide member 24 is inserted into the guide hole 58 of the spacer 56, whereby the drum 52 and the spindle 18 are axially aligned with each other. Simultaneously with this, the connecting pins 62 are inserted into the axial holes 64 to rotationally interconnect the drum and the spindle 18. The clutch 36 is engaged to transmit a driving force from the air motor 38 to the inner shaft 26 for thereby rotating the inner shaft 26 relative to the spindle 18. The threaded section 48 of the spacer 56 is screwed into the threaded section 34 of the inner shaft 26, pulling the drum 52 toward the spindle 18. The matched ends of the spacer 56 and the spindle 18 are brought into contact with each other. The clutch 36 is then disengaged and the air motor 38 is stopped. The locking pins 68 are rotated to engage the levers 80 in the deep grooves 84, thus allowing the locking pins 68 to move inward under the bias of the springs 74 and engage in the detent teeth 78. The inner shaft 26 and the drum 52 are thus rotationally held fast relative to each other. The lifting band 87 is removed from the drum 52, after which the holding means 50 is put into an operative position of allowing the spindle 18 to be freely rotatable.

In tire construction, the spindle 18, inner shaft 26 and drum 52 rotate together being driven by the driving motor 23. Tire constituting members such as layers of rubber sheet, plies of ruberized fabric, etc. are wrapped around the rotating drum 52 to form a green tire.

From the foregoing, it will be appreciated that the concentricity between the drum and the spindle can be improved considerably since the drum and the spindle are connected to each other by the pair of threaded sections which are concentrically disposed therewith.

It will be further appreciated that the work efficiency in installation and removal is improved considerably since the fastening and unfastening of the threaded sections is attained by rotating the inner shaft only and further since the inner shaft can be lockingly engaged with or disengaged from the spindle by simple and easy work.

While the present invention has been described and shown as above, numerous modifications and changes may be made thereto without departing from the scope or sprit of the invention. For example, the threaded section 34 may be substituted by a male thread formed in the outer circumferential wall of the inner shaft 26 while the threaded section 48 by a female thread formed in a hole provided to the spacer 56 or drum 54. Further, the locking pins 68 may otherwise be installed in the spindle 18 to be operative to make the spindle 18 and the inner shaft 26 held fast relative to each other. Further, the threaded section 34 may be substituted by a threaded section provided to the spindle 18. In this case, the threaded section of the spindle 18 may be a male thread or female thread though it is necessary for the inner shaft 26 and the drum 52 to be connected in such a manner as to be rotationally held fast while being axially movable relative to each other, for example, to be connected by a polygonal hole and a shaft having a polygonal cross section and fittingly insertable into the polygonal hole.

What is claimed is:

1. A drum installing mechanism for a tire-building machine, comprising:
   a hollow spindle;
   a drum having a drum shaft and a spacer axially aligned with said spindle, said spacer being interposed between said spindle and said drum shaft and secured to said drum shaft;
   an inner shaft concentrically disposed in said spindle for rotation but against axial movement relative thereto;
   a first threaded section provided concentrically to said inner shaft;
   a second threaded section provided concentrically to said spacer;
   means for rotating said inner shaft relative to said spindle and thereby joining said first and second threaded sections together so as to hold said spindle and said spacer axially fast relative to each other; and
   means for connecting said spindle, said inner shaft and said spacer in such a manner as to hold them rotationally and releasably fast relative to each other.

2. A drum installing mechanism as set forth in claim 1, wherein said inner shaft has at an end a concentric fastening hole formed with said first threaded section and said spacer has a concentric fastening shaft projecting toward said inner shaft and formed with said second threaded section.

3. A drum installing mechanism as set forth in claim 2 wherein said spindle is provided with a guide member in the form of a cylindrical sleeve and disposed concentrically with said spindle, said guide member having a portion disposed inside of said spindle to be secured thereto and a portion projecting outward from said spindle, said spacer having a concentric guide hole into which said second mentioned portion of said guide member is inserted so as to axially align said spindle and said drum with each other.

4. A drum installing mechanism as set forth in claim 3 wherein said connecting means comprises a plurality of connecting pins screwed into an end of said spindle and projecting therefrom in parallel with the axis of same, a plurality of axial holes formed in said spacer and fittingly receiving therein said connecting pins, detent teeth formed in an outer circumferential periphery of said inner shaft, a plurality of radial holes formed in said sapcer and a plurality of locking pins movable in said respective radial holes so as to engage in and disengage from said detent teeth.

5. A drum installing mechanism as set forth in claim 4 wherein said rotating means comprises an air motor and a clutch interposed between said air motor and said inner shaft for selectively transmitting power from said air motor to said inner shaft.

6. A drum installing mechanism as set forth in claim 1, further comprising means for locating said spindle and fixedly holding said spindle at a predetermined angular position.

* * * * *